United States Patent
Welch et al.

(10) Patent No.: US 11,428,105 B2
(45) Date of Patent: Aug. 30, 2022

(54) AIRFOIL WITH INTEGRAL PLATFORM FOR GAS TURBINE ENGINES

(71) Applicant: United Technologies Corporation, Farmington, CT (US)

(72) Inventors: David A. Welch, Quaker Hill, CT (US); Michael Raymond LaFavor, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 124 days.

(21) Appl. No.: 16/846,590

(22) Filed: Apr. 13, 2020

(65) Prior Publication Data

US 2021/0317747 A1   Oct. 14, 2021

(51) Int. Cl.
*F01D 5/30* (2006.01)
*F01D 5/20* (2006.01)
(Continued)

(52) U.S. Cl.
CPC ............... *F01D 5/20* (2013.01); *F01D 5/186* (2013.01); *F01D 5/141* (2013.01); *F01D 5/147* (2013.01);
(Continued)

(58) Field of Classification Search
CPC ........ F01D 5/30; F01D 5/3007; F01D 5/3015; F01D 5/3084; F01D 5/3092; F01D 5/282;
(Continued)

(56) References Cited

U.S. PATENT DOCUMENTS

| 4,343,593 A | 8/1982 | Harris |
| 6,041,132 A * | 3/2000 | Isaacs ................. G01N 23/046 378/21 |

(Continued)

FOREIGN PATENT DOCUMENTS

EP    2713014    4/2014

OTHER PUBLICATIONS

European Search Report for European Patent Application No. 21168047.5 completed Aug. 31, 2021.

*Primary Examiner* — Courtney D Heinle
*Assistant Examiner* — Danielle M. Christensen
(74) *Attorney, Agent, or Firm* — Carlson, Gaskey & Olds, P.C.

(57) ABSTRACT

An airfoil assembly for a gas turbine engine according to an example of the present disclosure includes, among other things, an airfoil that has an airfoil section extending from a root section. The airfoil section extends between a leading edge and a trailing edge in a chordwise direction and extends between a tip portion and the root section in a radial direction, and the airfoil section defining a pressure side and a suction side separated in a circumferential direction. A platform includes a first and second platform portions attached to the root section. Each of the first and second platform portions includes a shoe section and a platform section extending in the circumferential direction from the shoe section to establish a gas path surface, and the shoe sections of the first and second platforms are circumferentially arranged on opposed sides of the root section to capture the root section in a root cavity established between the shoe sections. A method of assembly is also disclosed.

20 Claims, 6 Drawing Sheets

(51) Int. Cl.
*F01D 5/18* (2006.01)
*F01D 5/14* (2006.01)

(52) U.S. Cl.
CPC .... *F05D 2220/36* (2013.01); *F05D 2240/304* (2013.01); *F05D 2240/307* (2013.01); *F05D 2240/35* (2013.01); *F05D 2250/185* (2013.01); *F05D 2260/202* (2013.01)

(58) Field of Classification Search
CPC ............ F01D 5/3023; F05D 2250/185; F05D 2220/36; F05D 2240/30; F05D 2240/80; F05D 2260/30; F05D 2300/6033
See application file for complete search history.

(56) References Cited

U.S. PATENT DOCUMENTS

| | | |
|---|---|---|
| 8,721,290 B2 | 5/2014 | Darkins, Jr. et al. |
| 9,228,445 B2 | 1/2016 | Darkins, Jr. et al. |
| 10,024,173 B2 | 7/2018 | McCaffrey |
| 10,060,277 B2 | 8/2018 | Engel et al. |
| 2004/0258528 A1 | 12/2004 | Gogo et al. |
| 2013/0121833 A1* | 5/2013 | Lucashu .................. F01D 9/04 416/203 |
| 2017/0370376 A1* | 12/2017 | Kray .................... F04D 29/388 |
| 2018/0119549 A1 | 5/2018 | Vetters et al. |
| 2018/0149026 A1* | 5/2018 | Vetters .................... F02C 3/04 |
| 2020/0018177 A1* | 1/2020 | Sippel .................. F01D 5/282 |

* cited by examiner

AIRFOIL WITH INTEGRAL PLATFORM FOR GAS TURBINE ENGINES

BACKGROUND

This disclosure relates to a gas turbine engine, and more particularly to airfoil arrangements including a platform for establishing a gas path surface.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The fan typically includes an array of fan blades having dovetails that are mounted in slots of a fan hub driven by a turbine.

SUMMARY

An airfoil assembly for a gas turbine engine according to an example of the present disclosure includes an airfoil that has an airfoil section extending from a root section. The airfoil section extends between a leading edge and a trailing edge in a chordwise direction and extends between a tip portion and the root section in a radial direction, and the airfoil section defining a pressure side and a suction side separated in a circumferential direction. A platform includes a first and second platform portions attached to the root section. Each of the first and second platform portions includes a shoe section and a platform section extending in the circumferential direction from the shoe section to establish a gas path surface, and the shoe sections of the first and second platforms are circumferentially arranged on opposed sides of the root section to capture the root section in a root cavity established between the shoe sections. The root section comprises a first material. The platform comprises a second material that differs from the first material, and one of the first and second materials is a metallic material.

In a further embodiment of any of the foregoing embodiments, the first material comprises a composite material, and the second material comprises the metallic material.

In a further embodiment of any of the foregoing embodiments, the composite material is an organic matrix composite, and the metallic material is titanium.

In a further embodiment of any of the foregoing embodiments, the composite material includes a first set of plies arranged to extend from the root section at least partially into the airfoil section.

In a further embodiment of any of the foregoing embodiments, the airfoil section and the root section are joined at a neck section. The root section has a dovetail geometry. The composite material includes a second set of plies arranged in the root section between adjacent plies of the first set of plies to establish the dovetail geometry such that a maximum width of the neck section is less than a maximum width of the root section with respect to the circumferential direction.

In a further embodiment of any of the foregoing embodiments, a minimum axial length of the neck section in an axial direction is at least 50% of a maximum axial length of the airfoil section between the leading and trailing edges in the axial direction. The root section includes sloped bearing surfaces defining the dovetail geometry, and a ratio of the maximum width of the neck section to the maximum width of the root section is between 0.4 and 0.8.

In a further embodiment of any of the foregoing embodiments, the shoe section includes a sidewall having a complementary geometry to the root section and a base wall extending from the sidewall to establish a floor of the root cavity, and the root section is dimensioned to sit on the floor of the shoe section in an installed position.

In a further embodiment of any of the foregoing embodiments, the shoe section includes an axial wall extending inwardly from the sidewall to bound the root cavity in the chordwise direction.

In a further embodiment of any of the foregoing embodiments, the axial wall of the first platform portion and the axial wall of the second platform portion are arranged to establish an interface having a serpentine geometry.

In a further embodiment of any of the foregoing embodiments, the airfoil is a fan blade.

A gas turbine engine according to an example of the present disclosure includes a fan section including a fan shaft rotatable about an engine longitudinal axis, a compressor section, and a turbine section that has a fan drive turbine mechanically coupled to the fan shaft. The fan section includes a rotor assembly. The rotor assembly includes a hub mechanically attached to the fan shaft, the hub having an array of slots about an outer periphery of the hub, and an array of fan blades each including an airfoil section extending from a root section and a platform including first and second platform portions that cooperate to establish a root cavity. Each of the first and second platform portions includes a shoe section and a platform section extending in a circumferential direction from the shoe section to establish a gas path surface, and the shoe sections of the first and second platform portions are arranged to capture the root section in the root cavity such that the root section is mounted in a respective one of the slots.

In a further embodiment of any of the foregoing embodiments, the root section comprises a first material. The platform comprises a second material that differs from the first material, one of the first and second materials is a composite material, and another one of the first and second materials is a metallic material.

In a further embodiment of any of the foregoing embodiments, the shoe section includes a sidewall interconnecting the platform section and a base wall. The sidewall is dimensioned to follow a contour of the root section and is dimensioned to follow a contour of the respective slot such that a load path is established between the root section and surfaces of the respective slot. The base wall extends inwardly from the sidewall, and the root section is dimensioned to sit on the base wall in an installed position.

In a further embodiment of any of the foregoing embodiments, the root section has a dovetail geometry that establishes the respective contour, and surfaces of the shoe section are mechanically attached to surfaces of the root section along the respective contour.

A method of assembly for a gas turbine engine according to an example of the present disclosure includes capturing a root section of a fan blade in a root cavity, the fan blade including a platform and an airfoil section extending from the root section, and includes moving a first platform portion of the platform relative to a second platform portion of the platform to establish the root cavity between respective shoe sections of the first and second platform portions. Each of the first and second platform portions includes a platform section extending in a circumferential direction from the shoe section to establish a gas path surface. The method includes moving the first and second platform portions together with the captured root section as an assembly at least partially into a slot of a rotatable hub to mount the fan blade. The shoe section is dimensioned to follow a contour of the root section and is dimensioned to follow a contour of the slot such that a load path is established between the root section and surfaces of the slot. The root section comprises a first material. The platform comprises a second material that differs from the first material, one of the first and second materials is a metallic material, and another one of the first and second materials is a composite material.

In a further embodiment of any of the foregoing embodiments, the capturing step includes bonding the shoe section of the first and second platform portions to the root section to establish the assembly.

In a further embodiment of any of the foregoing embodiments, the first material comprises a composite material including a first set of plies and a second set of plies, the second material comprises the metallic material. The first set of plies are arranged to extend from the root section at least partially into the airfoil section. The airfoil section and the root section are joined at a neck section. The root section has a dovetail geometry. The second set of plies are arranged in the root section between adjacent plies of the first set of plies to establish the dovetail geometry, and a minimum axial length of the neck section in an axial direction is at least 50% of a maximum axial length of the airfoil section between leading and trailing edges of the airfoil section in the axial direction. The method includes co-curing the first and second plies together with the first and second platform portions.

In a further embodiment of any of the foregoing embodiments, the root section is dimensioned to sit on the shoe section in an installed position.

In a further embodiment of any of the foregoing embodiments, the capturing step includes capturing the root section between circumferential walls of the shoe sections of the first and second platform portions and includes capturing the root section between opposed axial walls of each of the shoe sections such that the first and second platform portions substantially encase the root section.

In a further embodiment of any of the foregoing embodiments, one of the axial walls of the first platform portion and one of the axial walls of the second platform portion are arranged to establish an interface having a serpentine geometry.

The various features and advantages of this invention will become apparent to those skilled in the art from the following detailed description of an embodiment. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
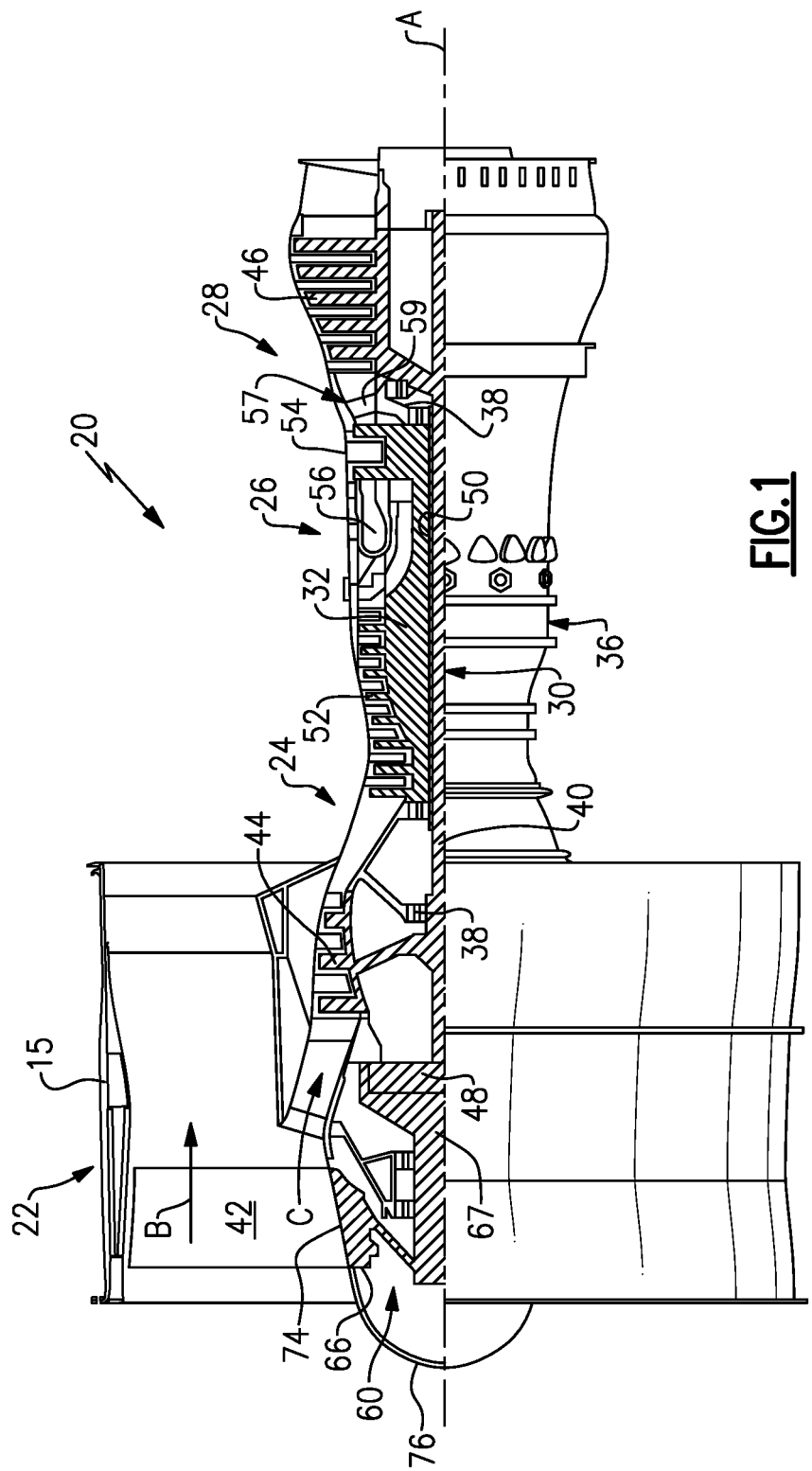
FIG. 1 shows an exemplary gas turbine engine including a fan section.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]0.5. The "Low corrected fan tip speed" as disclosed herein according to one non-limiting embodiment is less than about 1150 ft/second (350.5 meters/second).

Figure 2A:
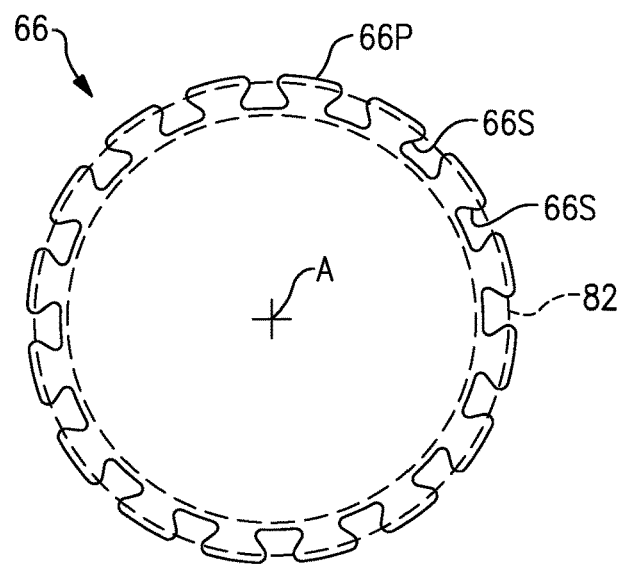
FIG. 2A illustrates an axial view of a rotatable hub of the rotor assembly of FIG. 2.
Figure 2:
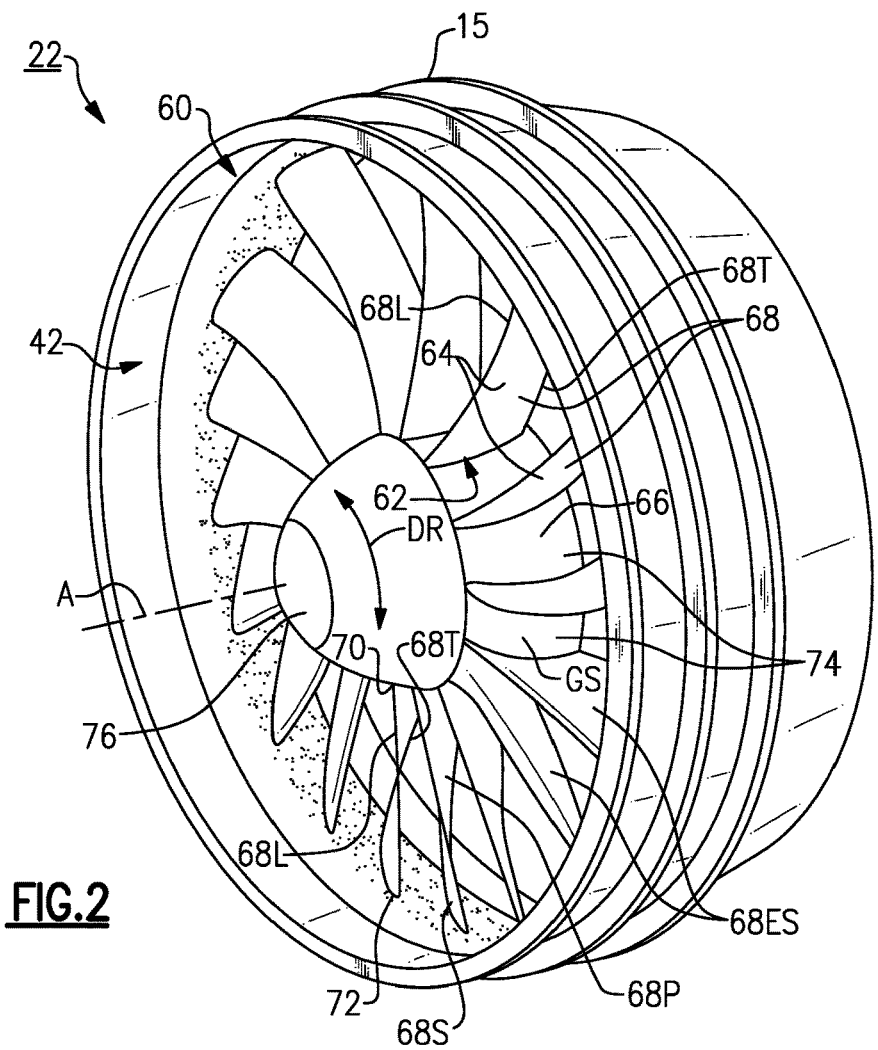
FIG. 2 is a perspective view of the fan section of FIG. 1 including a rotor assembly.

Referring to FIG. 2, with continuing reference to FIG. 1, aspects of the fan section 22 are shown. The fan 42 includes a rotor assembly 60 having an array or row 62 of rotatable airfoils or fan blades 64 that extend circumferentially about and are supported by a rotatable fan hub 66 (see also FIG. 2A). Any suitable number of fan blades 64 may be used in a given application, including 24 or fewer fan blades, or more narrowly between 12 and 20 fan blades such as 14 or 16 fan blades. The fan 42 can include a fan pressure ratio of less than 1.45 across the fan blade alone, or more narrowly equal to or greater than 1.25. Although only one (or a forwardmost) row 62 of fan blades 64 is shown, the teachings herein can apply to engine arrangements having two or more rows of fan blades.

The fan hub 66 is mechanically attached to a fan shaft 67, and the fan drive turbine 46 is mechanically coupled to the fan shaft 67 as illustrated in FIG. 1. The fan hub 66 is rotatable in a direction DR about the engine axis A. The direction DR can be clockwise or counter-clockwise with respect to the engine axis A. The fan hub 66 includes an array of slots 66S defined about an outer periphery 66P of the fan hub 66, as illustrated in FIG. 2A.

Figure 3:
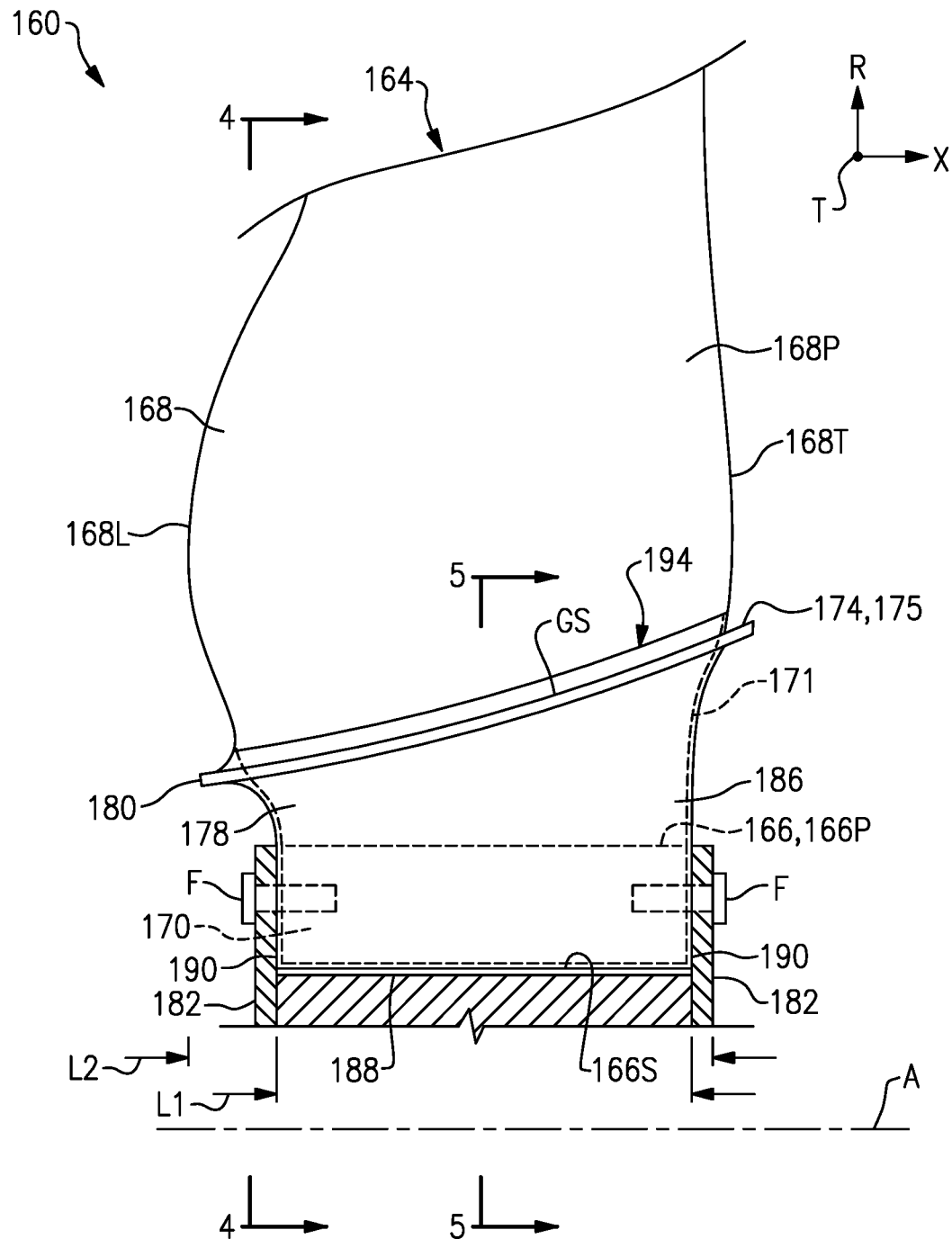
FIG. 3 illustrates a sectional view of a rotor assembly according to another example.

Each of the fan blades 64 includes an airfoil section 68 that extends in a radial or spanwise direction R from the hub 66 between a root section 70 and a tip portion 72, in a chordwise direction (axially and circumferentially) X between a leading edge 68L and a trailing edge 68T, and in a thickness or circumferential direction T between a pressure sidewall (or side) 68P and a suction sidewall (or side) 68S (see FIG. 3 for directions R, X and T). The pressure sidewall 68P and the suction sidewall 68S are spaced apart and generally meet together at both the leading and trailing edges 68L, 68T.

Each fan blade 64 has an exterior surface 68ES providing a contour that extends in the chordwise direction from the leading edge 68L to the trailing edge 68T along the airfoil section 68. The exterior surface 68ES generates lift based upon its geometry and directs flow along the core flow path C and bypass flow path B. The fan blade 64 may be constructed from a composite material, a metal material such as an aluminium or titanium alloy, or a combination of one or more of these, for example. Abrasion-resistant coatings or other protective coatings may be applied to the fan blade 64.

The root section 70 is received in a correspondingly shaped slot 66S (FIG. 2A) in the hub 66. The rotor assembly 60 can include one or more retention members 82 to secure the fan blades 64 (shown in dashed lines in FIG. 2A for illustrative purposes). In the illustrative example of FIG. 2A, each retention member 82 is an annular retention ring mounted to respective forward and aft axial faces of the hub 66 to limit movement of the fan blades 64 in the slots 66S.

The airfoil section 68 extends radially outward of a platform 74, which provides the inner flow path. The platform 74 may be integral with the blade 64 or separately secured to the hub 66, for example, and establishes a gas path surface GS. In some examples, the fan blade 64 is joined or machined integral with the hub 66 to form an integrally bladed rotor (IBR). A spinner (or nosecone) 76 is supported relative to the hub 66 to provide an aerodynamic inner flow path into the fan section 22.

Figure 4:
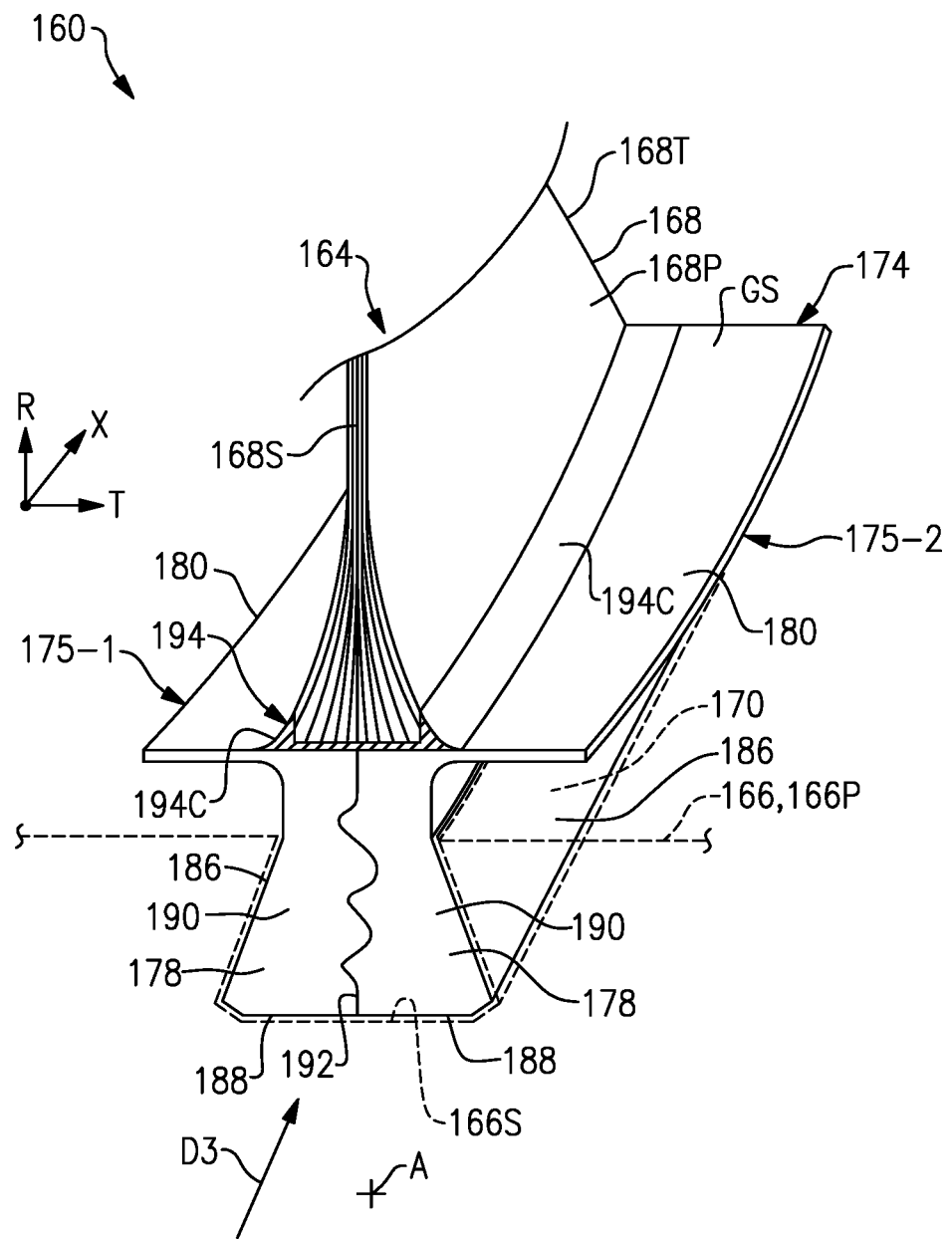
FIG. 4 illustrates a sectional view of the rotor assembly taken along line 4-4 of FIG. 3.

FIGS. 3 and 4 illustrate a rotor assembly 160 according to another example. In this disclosure, like reference numerals designate like elements where appropriate and reference numerals with the addition of one-hundred or multiples thereof designate modified elements that are understood to incorporate the same features and benefits of the corresponding original elements. The rotor assembly 160 can be incorporated into the fan section 22 of FIGS. 1 and 2, for example. Other portions of the engine 20 and other systems can benefit from the teachings disclosed herein, including airfoils in the compressor and turbine sections 24, 28 and static vanes.

Figure 5:
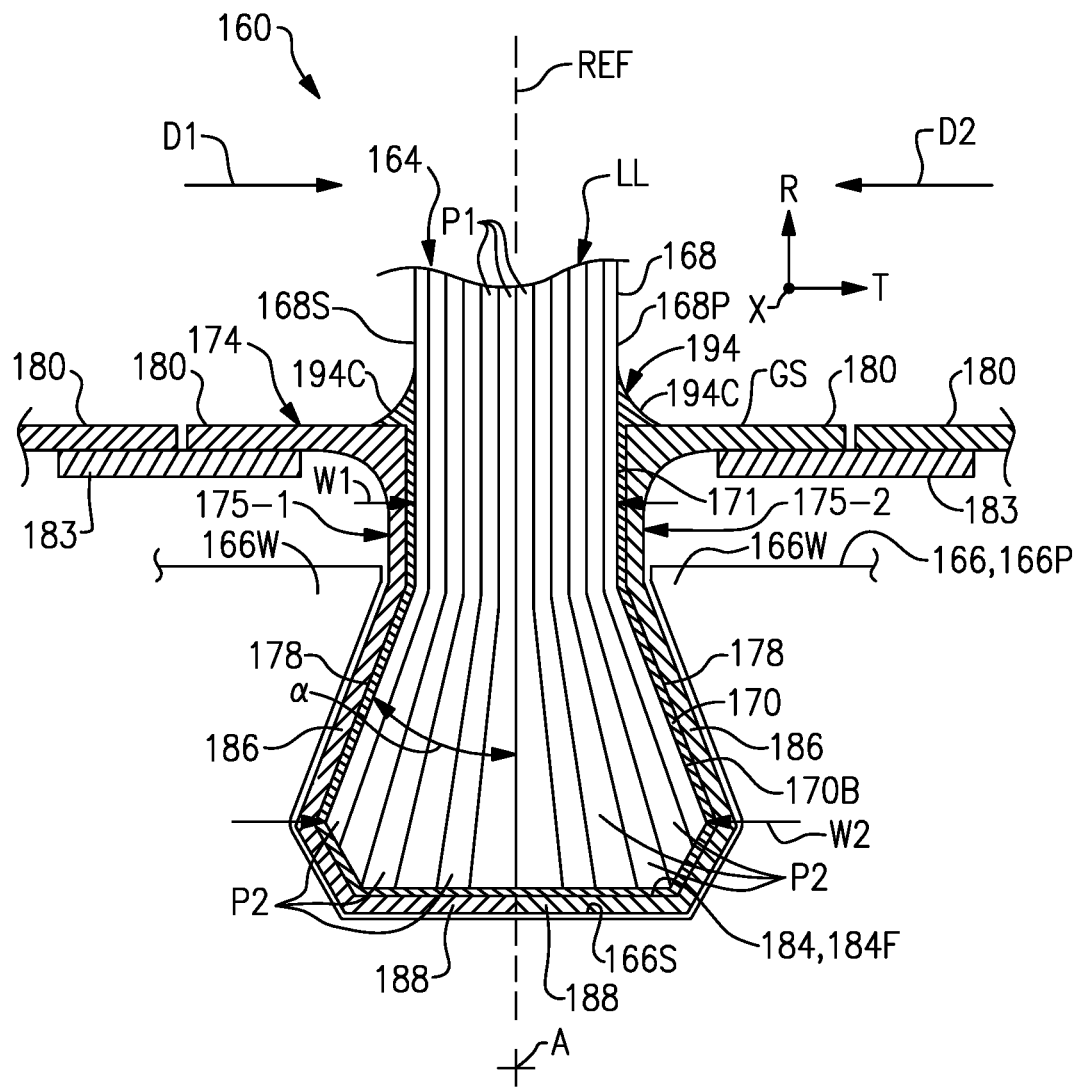
FIG. 5 illustrates a sectional view of the rotor assembly taken along line 5-5 of FIG. 3.

The rotor assembly 160 includes an array of airfoils 164 (one shown for illustrative purposes). In the illustrated example of FIGS. 3-4, the airfoil 164 is a fan blade. The airfoil 164 includes an airfoil section 168 extending from a root section 170 (FIG. 5). The airfoil section 168 and root section 170 are joined at a neck section 171 (FIG. 5). The airfoil section 168 extends between a leading edge 168L (FIG. 3) and a trailing edge 168T in a chordwise direction X and extends between a tip portion (see FIG. 2) and the root section 170 in a radial or spanwise direction R. The airfoil section 168 defines a pressure sidewall (or side) 168P and a section sidewall (or side) 168S (FIG. 3) separated in a circumferential or thickness direction T. It should be understood that the airfoil profile including the contouring of the pressure and suction sides 168P, 168S is exemplary and other airfoil profiles can be utilized according to the teachings disclosed herein.

Each airfoil 164 includes a platform 174 having a plurality of platform portions 175 that cooperate to establish a gas path surface GS. The platform 174 can be dimensioned to slope in the chordwise direction X such that the gas path surface GS is generally inclined from an axially forward position to an axially aft position relative to the longitudinal axis A, as illustrated in FIG. 3. In the illustrated example of FIG. 4, the platform 174 includes first and second platform portions (or halves) 175 each attached to the root section 170 (indicated at 175-1, 175-2 for illustrative purposes). The first and second platform portions 175-1, 175-2 are separate and distinct components joined to the airfoil 164.

Each platform portion 175 includes a shoe section 178 and a platform section 180. The platform section 180 extends in the circumferential direction T from the shoe section 178 to establish the gas path surface GS. The gas path surface GS can establish at least a portion of an inner diameter flow path boundary of the fan section 22 of FIG. 2, for example.

The hub 166 includes an array of slots 166S defined about an outer periphery 166P of the hub 166 (one slot shown in FIGS. 3-5 for illustrated purposes, see also slots 66S of FIG. 2A). The rotor assembly 160 can include one or more retention members 182 mechanically attached or otherwise secured to the hub 166 to secure the platform portions 175 in the respective slots 166S, as illustrated in FIG. 3. In the illustrative example of FIG. 3, the retention members 182 are annular retention rings mounted to respective forward and aft axial faces of the hub 166 with one or more fasteners F to limit movement of the airfoils 164 and platforms 174 in the axial direction X.

Referring to FIG. 5, with continuing reference to FIGS. 3 and 4, seal members 183 can be positioned relative to adjacent platform sections 180 to limit the flow of fluid between intersegment gaps established by the respective mate faces. In other examples, the seal member 183 is omitted.

The root section 170 has a generally dovetail shaped geometry. The dovetail geometry is established such that opposed sidewalls of the root section 170 flare outwardly from the neck section 171 relative to the circumferential direction T.

The platform portions 175 are joined together or otherwise cooperate to establish a root cavity 184. The root cavity 184 is dimensioned to have a complementary contour with the root section 170 of the airfoil 164. The root cavity 184 can be established between the shoe sections 178 of the respective platform portions 175. The shoe sections 178 are circumferentially arranged on opposed sides of the root section 170 relative to the circumferential direction T and cooperate to capture at least a portion of the root section 170 in the root cavity 184. The shoe sections 178 cooperate to mount the root section 170 in a respective one of the slots 166S in an installed position.

Each shoe section 178 includes a sidewall (or circumferential wall) 186, a base wall 188, and opposed axial walls 190 (see FIGS. 3-4). A cross section of each the platform portions 175 can be dimensioned to have a generally S-shaped profile established by the shoe section 178 and platform section 180, as illustrated by FIG. 5. The shoe section 178 can have a substantially uniform wall thickness between the platform section 180 and a terminal end of the shoe section 178 defined by the base wall 188 such that a distance between surfaces of the root section 170 and surfaces of the respective slot 166S is substantially the same along a perimeter of the slot 166S, as illustrated by FIG. 5. For the purposes of this disclosure, the terms "substantially" and "approximately" mean ±5% of the stated value unless otherwise disclosed.

The sidewall 186 interconnects the platform section 180 and the base wall 188. The sidewall 186 has a major component that extends in the radial direction R and has a complementary geometry to the root section 170 of the airfoil 164. The shoe section 178 is dimensioned to follow a contour of the root section 170 and is dimensioned to follow a contour of the respective slot 166S such that a direct load path is established between the root section 170 and surfaces of the respective slot 166S. In the illustrative example of FIG. 5, the sidewall 186 is dimensioned to follow the contour of the root section 170 established by the dovetail geometry, and the sidewall 186 is dimensioned to follow the contour of the respective slot 166S of the hub 166 to establish the direct load path.

Opposed sidewalls 166W of the hub 166 defining the slot 166S have a complementary geometry with the respective sidewalls 186 and base walls 178. The sidewalls 166W of the hub 166 extend inwardly to limit radial and circumferential movement of the root section 170 and/or shoe sections 178 in the installed position.

Each axial wall 190 has a major component in the circumferential direction T and extends inwardly from the sidewall 186 to bound the root cavity 184 in the chordwise direction X (see FIGS. 3-4). The axial walls 190 of the respective platforms 175-1, 175-2 are arranged to establish an interface 192 (FIG. 4). The axial walls 190 may more evenly distribute loads along adjacent surfaces of the root portion 170. The interface 192 can have various profiles, such as a generally linear or curvilinear geometry. In the illustrated example of FIG. 4, the interface 192 has a generally serpentine geometry including a plurality of inflection points spaced apart in the radial direction R. The serpentine geometry can be utilized to reduce relative floating between opposed surfaces of the root section 170 and the shoe section 178 when bonded together to maintain a predetermined position of the airfoil 164 relative to the hub 166.

Figure 6:
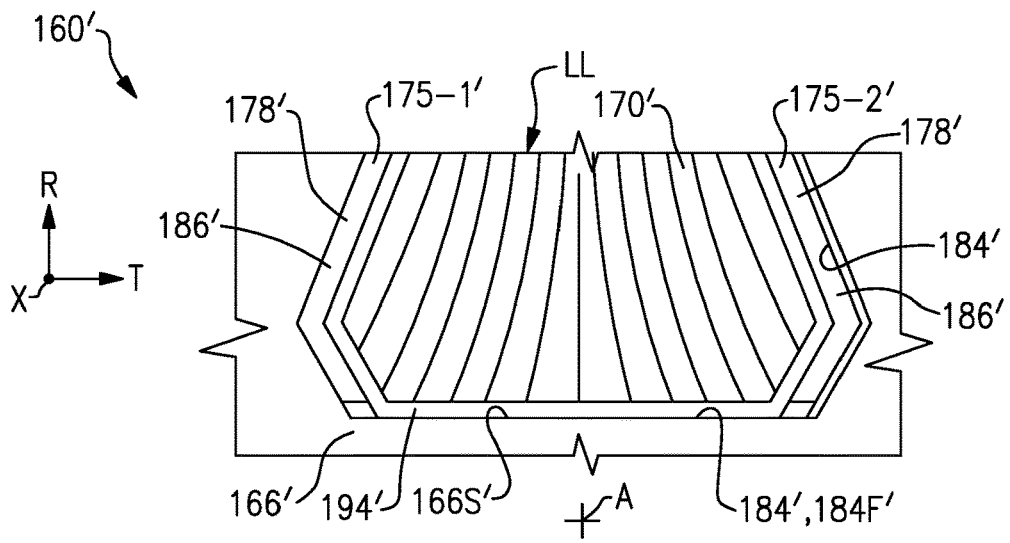
FIG. 6 illustrates a sectional view of a rotor assembly according to another example.

The base wall 188 of the shoe section 178 has a major component in the circumferential direction T and extends inwardly from the sidewall 186 to establish a floor 184F of the root cavity 184. A radial face of the root section 170 is dimensioned to sit on the floor 184F of the shoe section 178 in the installed position, as illustrated in FIG. 5. In the illustrated example of FIG. 6, the base wall is omitted from the shoe section 178' such that surfaces of the slot 166S' establish the floor 184F' of the root cavity 184'.

Various materials can be utilized or incorporated in the rotor assembly 160. The root section 170 of the airfoil 164 includes a first material. Each platform 174 includes a second material. The first and second materials can be the same or can differ in construction and/or composition. In examples, one of the first and second materials is a composite material, and another one of the first and second materials is a metallic material. For example, the first material can include a composite material, and the second material can include a metallic material. Example metallic materials include titanium, steel and aluminum.

Example composite materials include organic matrix composites. The organic matrix composite can include a matrix material and reinforcement fibers distributed through the matrix material. The reinforcement fibers can be discontinuous or continuous, depending upon the selected properties of the organic matrix composite. Example matrix materials include thermoset polymers or thermoplastic polymers. Example reinforcement fibers include carbon graphite, silica glass, and silicon carbide. Pre-pregs can also be utilized. Given this description, one of ordinary skill in the art will recognize that other types of matrix materials and reinforcement fibers can be utilized, including ceramic matrix composite materials. The platform portions 175 can be made of any of the materials disclosed herein, such as a composite material made of chopped fibers in an organic matrix composite and secured to a metallic airfoil.

In the illustrative example of FIG. 5, the airfoil 164 is formed of a composite material including a plurality of plies arranged in a layup LL. The layup LL includes a first set of plies P1 arranged to extend from the root section 170 at least partially into the neck section 171 and airfoil section 168 of the airfoil 164. At least some of the first set of plies P1 establish a radially inner face of the root section 170. The composite material can include a second set of plies P2 arranged in the root section 170 between adjacent plies of the first set of plies P1 to establish the dovetail geometry such that a maximum width W1 of the neck section 171 is less than a maximum width W2 of the root section 170 with respect to the circumferential direction T. The material of the platforms 174 can have a relatively lower compressive strain than the resin utilized in the layup LL. The root section 170 includes sloped bearing surfaces 170B on circumferentially opposed sides of the root section 170 that define the dovetail geometry. The bearing surfaces 170B have a component facing radially outward in a direction towards the airfoil section 168. In examples, approximately 85-95 percent of the circumferentially facing surfaces of the root section 170 between the neck portion 171 and a terminal end of the root section 170 received in the respective slot 166S are defined by the sloped bearing surfaces 170B. Each bearing surface 170B of the root section 170 is dimensioned to establish an angle α relative to a reference plane REF that extends in the radial direction R. In examples, the angle α is approximately 50-70 degrees, absolute, such as approximately 55 or approximately 65 degrees, absolute. The bearing surfaces 170B cooperate with the sidewalls 166W of the hub 166 to limit radial movement of the airfoil 164 in the respective slot 166S.

In examples, the ratio of W1:W2 is between 0.4 and 0.8 and the angle α is approximately 55-65 degrees. In some examples, the root section 170 and neck section 171 are dimensioned such that the angle α is approximately 55 degrees and the ratio is approximately 0.65-0.75, such as approximately 0.7. In other examples, the root section 170 and neck section 171 are dimensioned such that the angle α is approximately 65 degrees and the ratio is approximately 0.40-0.50, such as approximately 0.45. Utilizing the ratios of W1:W2 and angles α disclosed herein, loading on the bearing surfaces of the root section 170 can be distributed to reduce localized stress concentrations in the root section 170.

The airfoil 164 is dimensioned such that the neck section 171 establishes a minimum axial length L1 in the axial direction X and such that the airfoil section 168 establishes a maximum axial length L2 in the axial direction, as illustrated in FIG. 3. In examples, a ratio of the minimum axial length L1 of the neck section 171 is at least 50% or more narrowly at least 75% of the maximum axial length L2 of the airfoil section 168. The lengths L1, L2 can be taken with respect to the engine longitudinal axis A.

Various techniques can be utilized to mechanically attach surfaces of the shoe section 178 to surfaces of the root section 170. The airfoil 164 can include an interface member 194 that joins surfaces of the platform portions 175 and surfaces of the root section 170 and/or neck section 171. The interface member 194 can establish a radius or contour 194C such as a fillet between an exterior surface 168ES of the airfoil section 168 along the pressure and/or suction sides 168P, 168S and the gas path surface GS of the respective platform sections 180, as illustrated in FIG. 4, which may improve aerodynamic performance and reduce tip deflection during engine operation. The interface member 194 can include various materials, including epoxies and silicone-based materials such as room-temperature-vulcanizing (RTV) silicone. In other examples, the interface member 194 is omitted.

The rotor assembly 160 can be fabricated and assembled as follows. Referring to FIG. 5, the plies P1, P2 are arranged to establish a layup LL that form the airfoil 164 including the root section 170 and neck section 171. The interface member 194 can be deposited or otherwise positioned along surfaces of the layup LL.

The platform 174 is positioned relative to the respective airfoil 164, including moving at least one of the platform portions 175-1/175-2 relative to another one of the platform portions 175-1/175-2. For example, the first platform portion 175-1 can be moved in a first direction D1, and/or the second platform portion 175-2 can be moved in a second direction D2, which can be generally opposed to the first direction D1, such that the platform portions 175-1, 175-2 establish the root cavity 184 and interface 192 and abut against the airfoil 164 to capture the root section 170 in the root cavity 184. The relative movement between the platform portions 175-1, 175-2 can occur such that the root section 170 is captured circumferentially between sidewalls 186 of the shoe sections 178 and is captured axially between the opposed axial walls 190 of the shoe sections 178 such that the platform portions 175-1, 175-2 substantially encase the root section 170.

Capturing the airfoil 164 in the root cavity 184 can include mechanically attaching or otherwise securing the platform portions 175-1, 175-2 and the airfoil 164 to establish an assembly utilizing various techniques. In examples, the airfoil 164 is compression molded including co-curing the plies P1, P2 together with the platform portions 175-1, 175-2 to establish the assembly. Example forming techniques include epoxy-based molding and resin transfer molding which are generally known. In other examples, the shoe section 178 are bonded to the root section 170 to establish the assembly. Each platform 174 is integral with the respective airfoil 164 to establish the assembly as a result of co-curing, bonding or otherwise permanently attaching the platform portions 175-1, 175-2 to the airfoil 164.

Referring to FIG. 4, with continuing reference to FIG. 5, the platform portions 175-1, 175-2 are moved together with the captured root section 170 as an assembly in a third direction D3 (FIG. 4) at least partially into a respective slot 166S to mount the airfoil 164 to the hub 166.

Figure 7:
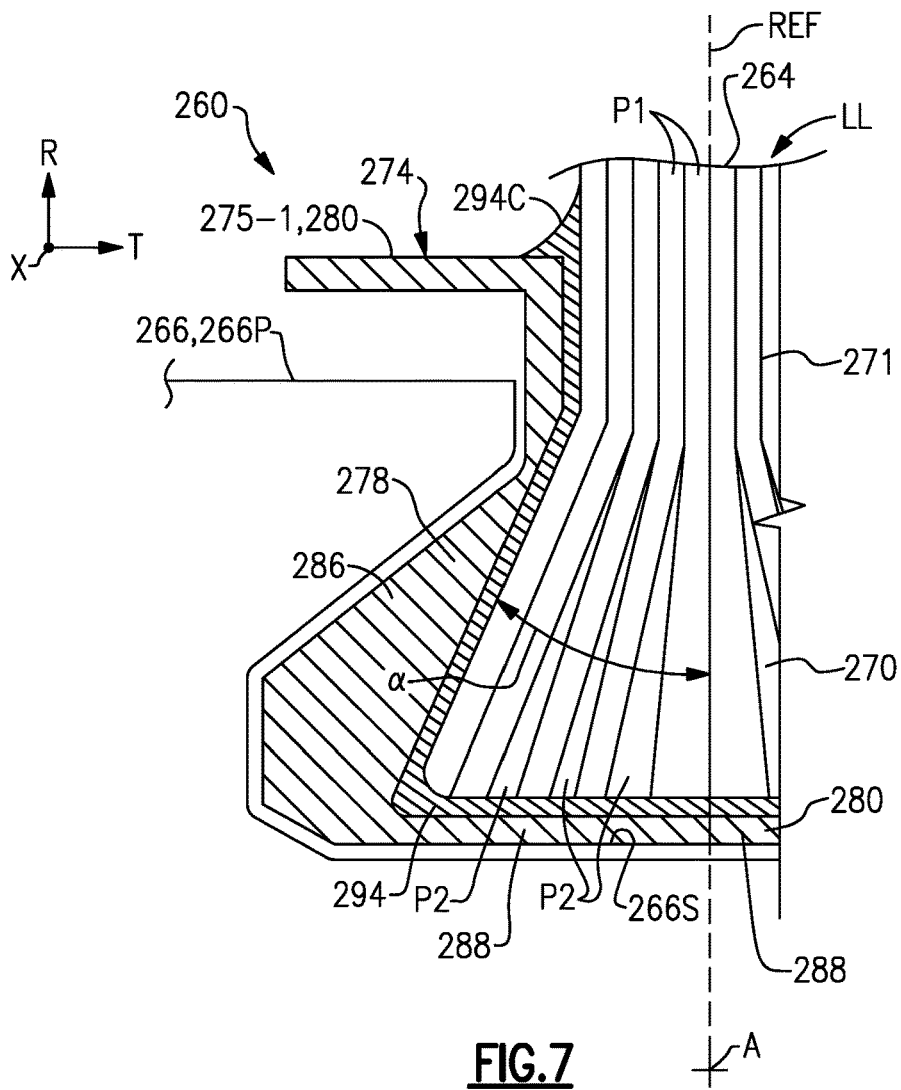
FIG. 7 illustrates a sectional view of a rotor assembly according to yet another example.

FIG. 7 illustrates a rotor assembly 260 according to another example. The rotor assembly 260 includes platform sections 275 including a wall thickness that differ along a perimeter of the slot 266S to accommodate an existing hub geometries. Different airfoil geometries than previously designed for the existing hub may be utilized in a retrofit procedure that mounts the new airfoils to the hub utilizing the same slot 266S geometry but a different profile of the root section 270, for example. The retrofit procedure may include incorporating composite airfoils into a root assembly having an existing hub previously dimensioned with respect to metallic airfoils having a different dovetail geometry.

In the illustrative example of FIG. 7, the shoe section 278 is dimensioned such that the wall thickness of the sidewall 286 varies at positions between the platform section 280 and the base wall 288. A distance between surfaces of the root section 270 and surfaces of the slot 266S differs along at least a portion of the perimeter of the slot 266S. Utilizing the techniques disclosed herein, existing hubs and new airfoil geometries can be incorporated into a rotor assembly by selecting complementary dimensions for the platform portions 275, which can reduce cost and complexity. The root section 270 is dimensioned to establish an angle α relative to a reference plane REF. In examples, the angle α is approximately 40-50 degrees, such as approximately 45 degrees.

The arrangements disclosed herein can be utilized to reduce stress concentrations on surfaces of the root sections of the airfoils and therefore may reduce an overall size of the root sections and slots formed in the hub. The disclosed platforms can be exclusively mounted to the hub via retention in the slots, which may reduce the need for separate mounting features on the hub (e.g., tombstones and fasteners).

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil assembly for a gas turbine engine comprising:
    an airfoil including an airfoil section extending from a root section, the airfoil section extending between a leading edge and a trailing edge in a chordwise direction and extending between a tip portion and the root section in a radial direction, and the airfoil section defining a pressure side and a suction side separated in a circumferential direction;
    a platform including a first and second platform portions attached to the root section, wherein each of the first and second platform portions includes a shoe section and a platform section extending in the circumferential direction from the shoe section to establish a gas path surface, and the shoe sections of the first and second platforms are circumferentially arranged on opposed sides of the root section to capture the root section in a root cavity established between the shoe sections;
    wherein the root section comprises a first material, the platform comprises a second material that differs from the first material, and one of the first and second materials is a metallic material; and
    wherein the shoe section includes a circumferential sidewall having a complementary geometry to the root section and a base wall extending inwardly in the circumferential direction from the circumferential sidewall to establish a floor of the root cavity, the shoe section includes an axial wall extending inwardly in the circumferential direction from the circumferential sidewall to a radial face to bound the root cavity in the chordwise direction, the radial faces of the first and second platform portions are arranged to meet each other along an interface having a serpentine geometry, and the radial faces are aligned with the root section relative to the circumferential direction.

2. The airfoil assembly as recited in claim 1, wherein the first material comprises a composite material, and the second material comprises the metallic material.

3. The airfoil assembly as recited in claim 2, wherein the composite material is an organic matrix composite, and the metallic material is titanium.

4. The airfoil assembly as recited in claim 2, wherein the composite material includes a first set of plies arranged to extend from the root section at least partially into the airfoil section.

5. The airfoil assembly as recited in claim 4, wherein:
    the airfoil section and the root section are joined at a neck section;
    the root section has a dovetail geometry; and
    the composite material includes a second set of plies arranged in the root section between adjacent plies of the first set of plies to establish the dovetail geometry such that a maximum width of the neck section is less than a maximum width of the root section with respect to the circumferential direction.

6. The airfoil assembly as recited in claim 5, wherein:
    a minimum axial length of the neck section in an axial direction is at least 50% of a maximum axial length of the airfoil section between the leading and trailing edges in the axial direction; and
    the root section includes sloped bearing surfaces defining the dovetail geometry, and a ratio of the maximum width of the neck section to the maximum width of the root section is between 0.4 and 0.8.

7. The airfoil assembly as recited in claim 1, wherein the root section is dimensioned to sit on the floor of the shoe section in an installed position.

8. The airfoil assembly as recited in claim 7, wherein the radial face of the first platform portion includes a first set of ridges and valleys, the radial face of the second platform portion includes a second set of ridges and valleys, and the first set of ridges and valleys interfit with the second set of ridges and valleys to establish the interface.

9. The airfoil assembly as recited in claim 1, wherein the airfoil is a fan blade.

10. A gas turbine engine comprising:
    a fan section including a fan shaft rotatable about an engine longitudinal axis;
    a compressor section; and
    a turbine section including a fan drive turbine mechanically coupled to the fan shaft; and
    wherein the fan section includes a rotor assembly, the rotor assembly comprising:
        a hub mechanically attached to the fan shaft, the hub including an array of slots about an outer periphery of the hub; and
        an array of fan blades each comprising:
            an airfoil section extending in a radial direction from a root section;
            a platform including first and second platform portions that cooperate to establish a root cavity, wherein each of the first and second platform portions includes a shoe section and a platform section extending in a circumferential direction from the shoe section to establish a gas path surface, and the shoe sections of the first and second platform portions are arranged to capture the root section in the root cavity such that the root section is mounted in a respective one of the slots; and wherein the shoe section includes a circumferential sidewall interconnecting the platform section and a base wall, the circumferential sidewall is dimensioned to follow a contour of the root section and is dimensioned to follow a contour of the respective slot such that a load path is established between the root section and surfaces of the respective slot, the base wall extends inwardly in the circumferential direction from the sidewall to establish a floor of the root cavity, the shoe section includes an axial wall extending inwardly in the circumferential direction from the circumferential sidewall to a radial face to bound the root cavity in the chordwise direction, the radial faces of the first and second platform portions are arranged to meet each other along an interface having a serpentine geometry, and the radial faces are aligned with the root section relative to the circumferential direction.

11. The gas turbine engine as recited in claim 10, wherein the root section comprises a first material, the platform comprises a second material that differs from the first material, one of the first and second materials is a composite material, and another one of the first and second materials is a metallic material.

12. The gas turbine engine as recited in claim 10, wherein the root section is dimensioned to sit on the base wall in an installed position.

13. The gas turbine engine as recited in claim 12, wherein the root section has a dovetail geometry that establishes the respective contour, and surfaces of the shoe section are mechanically attached to surfaces of the root section along the respective contour.

14. The gas turbine engine as recited in claim 12, wherein:
the airfoil section and the root section are joined at a neck section;
the neck section is aligned with the respective one of the slots relative to the radial direction; and
the root section has a dovetail geometry that establishes the respective contour.

15. The gas turbine engine as recited in claim 14, wherein the radial face of the first platform portion includes a first set of ridges and valleys, the radial face of the second platform portion includes a second set of ridges and valleys, and the first set of ridges and valleys interfit with the second set of ridges and valleys to establish the interface.

16. The gas turbine engine as recited in claim 15, wherein:
a minimum axial length of the neck section in an axial direction is at least 50% of a maximum axial length of the airfoil section between leading and trailing edges of the airfoil section in the axial direction; and
the root section includes sloped bearing surfaces defining the dovetail geometry, and a ratio of the maximum width of the neck section to the maximum width of the root section is between 0.4 and 0.8.

17. A method of assembly for a gas turbine engine comprising:
capturing a root section of a fan blade in a root cavity, the fan blade including a platform and an airfoil section extending from the root section, and including moving a first platform portion of the platform relative to a second platform portion of the platform to establish the root cavity between respective shoe sections of the first and second platform portions, wherein each of the first and second platform portions includes a platform section extending in a circumferential direction from the shoe section to establish a gas path surface;
moving the first and second platform portions together with the captured root section as an assembly at least partially into a slot of a rotatable hub to mount the fan blade, wherein the shoe section is dimensioned to follow a contour of the root section and is dimensioned to follow a contour of the slot such that a load path is established between the root section and surfaces of the slot;
wherein the root section comprises a first material, the platform comprises a second material that differs from the first material, one of the first and second materials is a metallic material, and another one of the first and second materials is a composite material; and
wherein the capturing step includes capturing the root section between circumferential sidewalls of the shoe sections of the first and second platform portions and includes capturing the root section between opposed axial walls of each of the shoe sections such that the first and second platform portions substantially encase the root section, wherein the axial walls extend in the circumferential direction from the circumferential walls to respective radial faces, the radial faces of one of the axial walls of the first and second platform portions are arranged to meet each other along an interface having a serpentine geometry, and the radial faces are aligned with the root section relative to the circumferential direction.

18. The method as recited in claim 17, wherein the capturing step includes bonding the shoe section of the first and second platform portions to the root section to establish the assembly.

19. The method as recited in claim 17, wherein the first material comprises a composite material including a first set of plies and a second set of plies, the second material comprises the metallic material, the first set of plies are arranged to extend from the root section at least partially into the airfoil section, the airfoil section and the root section are joined at a neck section, the root section has a dovetail geometry, the second set of plies are arranged in the root section between adjacent plies of the first set of plies to establish the dovetail geometry, and a minimum axial length of the neck section in an axial direction is at least 50% of a maximum axial length of the airfoil section between leading and trailing edges of the airfoil section in the axial direction, and further comprising:
co-curing the first and second plies together with the first and second platform portions.

20. The method as recited in claim 17, wherein the root section is dimensioned to sit on the shoe section in an installed position.

* * * * *